Figure 1:
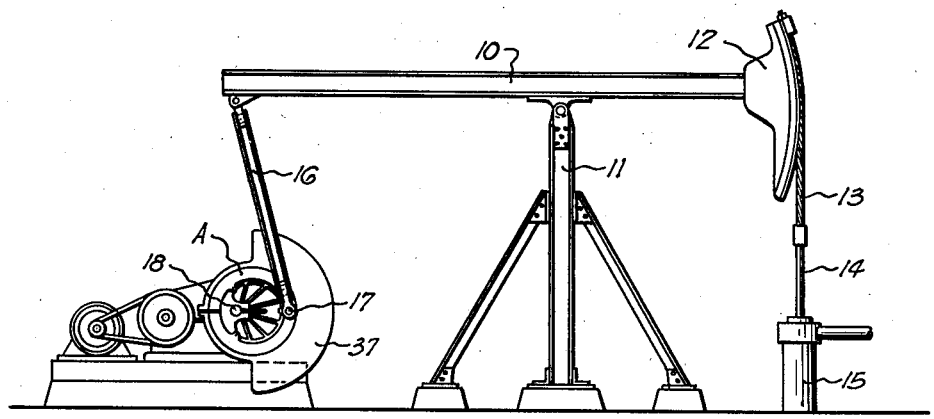

Sept. 23, 1941. R. W. BIER 2,256,605
COUNTERBALANCING APPARATUS
Filed June 3, 1939 3 Sheets-Sheet 1

Inventor
Robert W. Bier
By Jack A. Ehly
Attorney

Sept. 23, 1941.  R. W. BIER  2,256,605
COUNTERBALANCING APPARATUS
Filed June 3, 1939   3 Sheets-Sheet 2

Inventor
Robert W. Bier
By Jack A. Lehly
Attorney

Sept. 23, 1941.    R. W. BIER    2,256,605
COUNTERBALANCING APPARATUS
Filed June 3, 1939    3 Sheets-Sheet 3

Inventor
Robert W. Bier
By Jack A. Sehley
Attorney

Patented Sept. 23, 1941

2,256,605

UNITED STATES PATENT OFFICE 2,256,605

COUNTERBALANCING APPARATUS

Robert W. Bier, Houston, Tex.

Application June 3, 1939, Serial No. 277,184

15 Claims. (Cl. 74—603)

This invention relates to new and useful improvements in counterbalancing apparatus.

One object of the invention is to provide an improved counterbalancing apparatus which is particularly adapted for use on well pumping units and which is arranged so that it will efficiently counterbalance the load during a pumping, hoisting, or other operation.

An important object of the invention is to provide an improved counterbalancing apparatus wherein the counterweight may be adjustably locked in any position around the crank arm, whereby an infinite counterbalancing effect from minimum to maximum may be obtained.

A particular object of the invention is to provide an improved apparatus, of the character described, including a crank arm which is readily adjustable to any desired length between minimum and maximum, whereby an infinite stroke adjustment from minimum to maximum may be obtained and also whereby excessive wear on the gearing is obviated, which increases the life of the apparatus; the infinite stroke adjustment also making possible the use of a single wrist pin of sufficient size to prevent breakage of said pin, whereby more efficient operation is had.

Another object of the invention is to provide an improved counterbalancing apparatus including an adjustable crank arm having its counterweight arranged to be adjusted therearound, whereby the counterweight may be adjusted so that either proper counterbalancing for normal operation or any desired counterbalancing effect for back cranking may be readily secured, which makes the apparatus particularly advantageous and most practical in actual use.

Still another object of the invention is to provide an improved apparatus, of the character described, having a circular supporting member eccentrically mounted on the power or drive shaft so as to be rotatable therewith, with a ring surrounding the member and rotatably adjustable with relation thereto, said ring being adapted to be connected to the operating pitman, whereby the distance between the power shaft and the point of connection of the pitman to the ring determines the length of the crank arm; the mounting of the ring on the supporting member making it possible to quickly and easily move the ring to various adjusted positions to vary the length of the crank arm and thereby change the length of the pitman stroke.

A further object of the invention is to provide an eccentrically mounted supporting member which is constructed so as to be properly balanced and having a ring adjustably mounted thereon, which ring permits variation in the length of the crank arm, together with a counterweight adjustably mounted on the ring, whereby the proper stroke length and proper counterbalancing effect may be readily obtained; the crank arm being variable separately of the adjustment of the counterweight, whereby each may be individually adjusted without effecting the other.

A construction designed to carry out the invention will be hereinafter described, together with other features of the invention.

Figure 2:
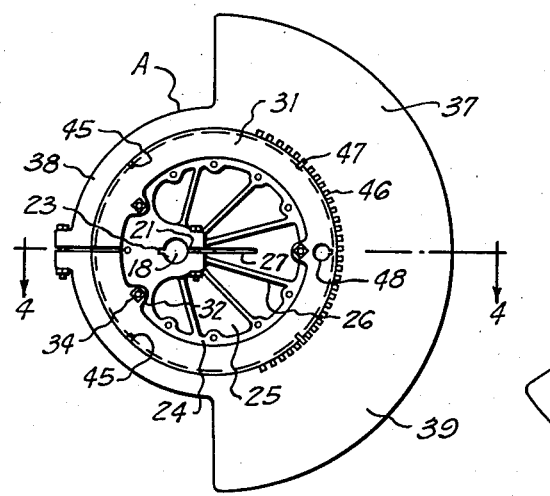
Figure 3:
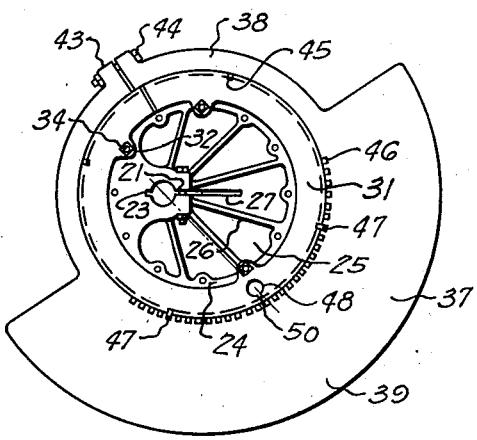
Figure 4:
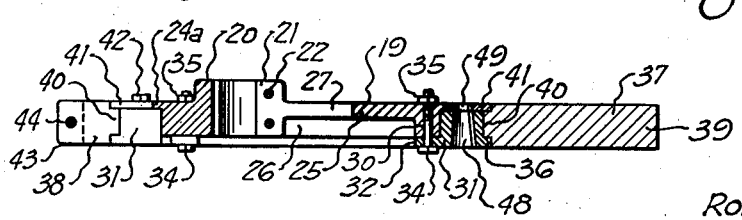
Figure 5:
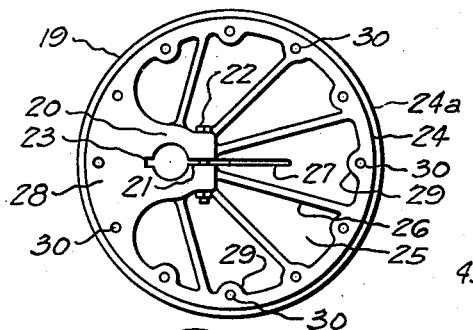
Figure 8:
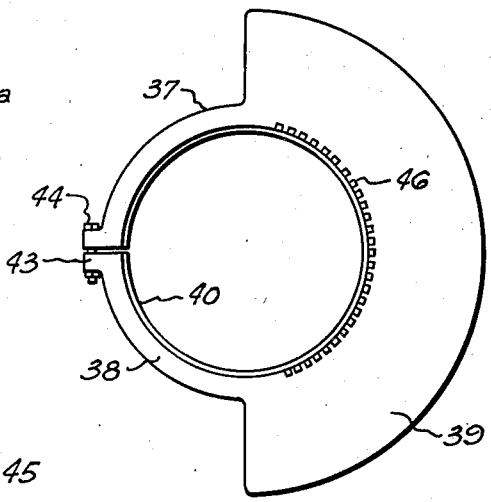
Figure 6:
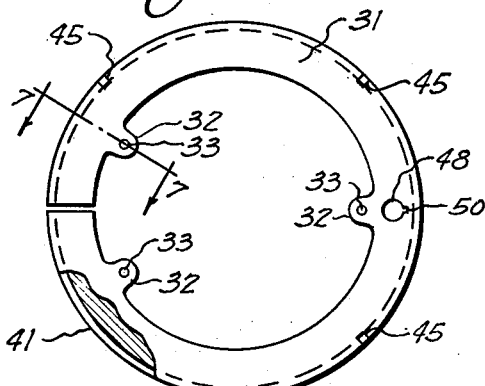
Figure 7:
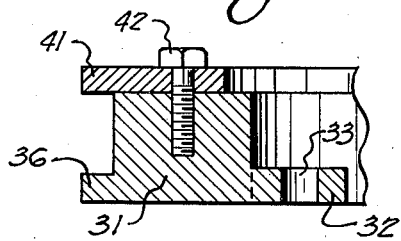
Figure 9:
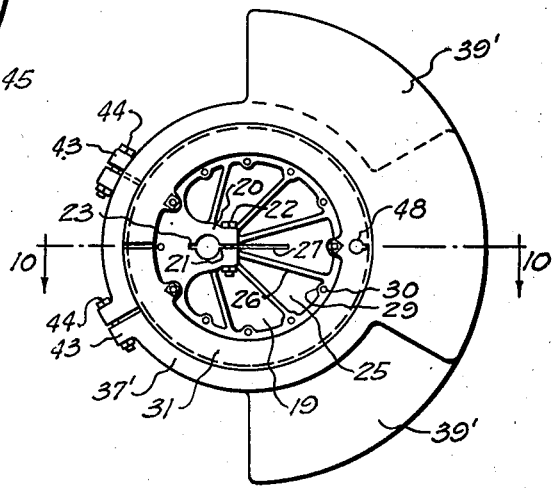

The invention will be more readily understood from a reading of the following specification and by reference to the accompanying drawings, in which an example of the invention is shown, and wherein:

Figure 1 is a side elevation of a well pumping rig, showing an improved counterbalancing apparatus associated therewith, Figure 2 is a side elevation of an apparatus constructed in accordance with the invention, Figure 3 is a view similar to Figure 2 and showing the counterweight moved to another position, Figure 4 is a horizontal, cross-sectional view, taken on the line 4—4 of Figure 2, Figure 5 is a side elevation of the inner circular supporting member, Figure 6 is a side elevation of the ring on which the counterweight is mounted, Figure 7 is an enlarged, transverse, sectional view taken on the line 7—7 of Figure 6, Figure 8 is a side elevation of the counterweight, Figure 9 is a view similar to Figure 2 and illustrating a slightly modified form of the invention wherein two counterweights are employed.

Figure 10:
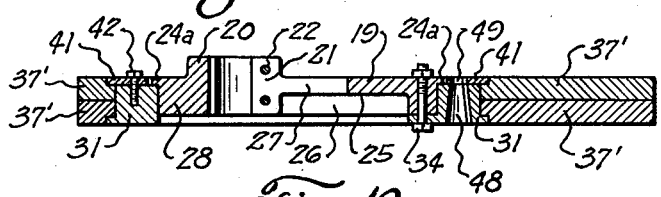
Figure 11:
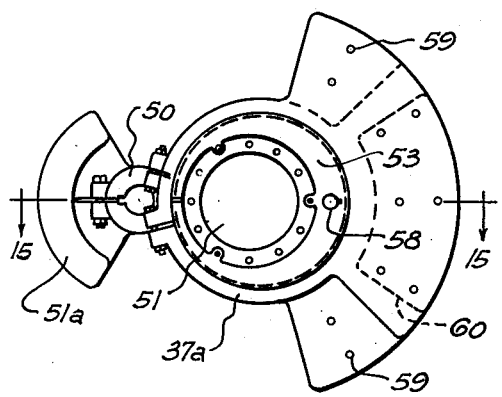
Figure 12:
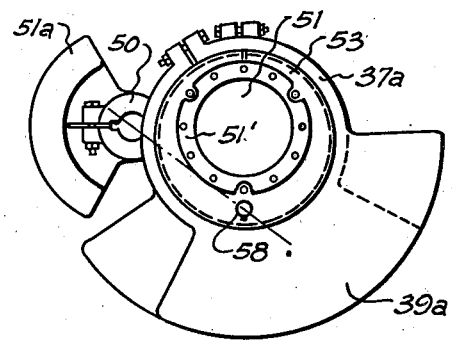
Figure 13:
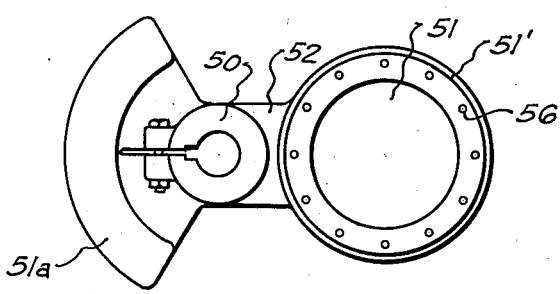
Figure 14:
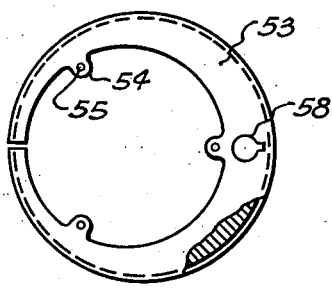
Figure 15:
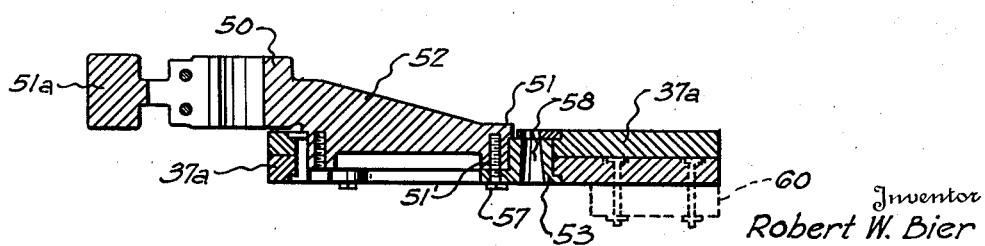

Figure 10 is a horizontal, cross-sectional view, taken on the line 10—10 of Figure 9, Figure 11 is a side elevation of a modified form of the apparatus, Figure 12 is a view similar to Figure 11 and showing the counterweight, as well as the ring, moved to another adjusted position, Figure 13 is a side elevation of the supporting member in this form of the invention, Figure 14 is a side elevation of the weight supporting ring, and Figure 15 is an enlarged horizontal, cross-sectional view taken on the line 15—15 of Figure 11.

In the drawings, the numeral 10 designates a walking beam which is pivotally mounted on the upper end of a suitable post 11 in the usual manner. One end of the walking beam is provided with the usual arcuate head 12 which has connection through a flexible cable 13 with the pump rods 14 of the well pump (not shown). The rods extend downwardly through the well casing 15 and, manifestly, when the walking beam is reciprocated or swung, the rods 14 are reciprocated vertically within the well casing to perform the pumping operation. The walking beam is adapted to be reciprocated by means of a pitman 16 which has its upper end pivoted to the end of said beam. The lower end of the pitman is connected, through a wrist pin 17 and through the improved crank arm and counterbalance apparatus A, which forms the present invention, to a crank shaft 18. The crank shaft 18 may be driven by any suitable motor, or other drive mechanism. Manifestly, when the crank shaft 18 is rotated, the pitman is reciprocated to swing the walking beam 10, whereby the pump rods 14 are reciprocated and the pumping operation performed.

The counterbalancing apparatus includes a circular disk or supporting member 19 which is provided with an offset hub 20. The hub is located off-center or eccentrically of the disk and is split at 21, whereby the crank shaft 18 may be inserted therein. Suitable bolts 22 are provided to tighten the hub around the shaft and, in addition, a keyway 23 is provided, whereby said hub may be keyed to the crank shaft. In this manner, the circular disk or supporting member 19 is mounted on the crank shaft so as to be rotatable therewith. The disk is formed with a flat rim 24 which is connected to the hub by a web 25, said web being reinforced by suitable ribs 26 which extend radially from the hub. Adjacent the split portion 21 of the hub, the web 25 is provided with an elongate slot 27, which slot forms a continuation of the split portion 21, whereby tightening of the hub around the shaft may be accomplished. Adjacent the hub 20 of the disk is an enlarged boss or solid portion 28 which is constructed of a solid metal. The weight of this boss serves to counterbalance the remainder of the disk, whereby said disk, although being eccentrically mounted with relation to the crank shaft, is balanced. The rim of the disk or member 19 is formed with a plurality of lugs or ears 29 which are spaced radially around said rim. Each lug has an opening 30 which extends transversely through the rim, as is clearly shown in Figures 4 and 5. Several of the openings 30 are also formed in the boss 28, being located adjacent the periphery of the disk or member 19. Any desired number of openings 30 may be provided.

A ring 31 surrounds the disk or supporting member 19 and has an inner diameter substantially equal to the outer diameter of said disk, whereby said ring may be rotatably mounted on said disk. The ring is preferably split and is formed with a plurality of inwardly directed ears 32, each of which is provided with an opening 33. When the ring is in position on the disk, one side of the ring abuts an annular peripheral flange 24a provided on the rim 24, while the ears 32 on said ring abut one side of the rim 24, as is clearly shown in Figure 4. The openings 33 in the ears 32 are adapted to be alined with certain of the openings 30 in the disk, whereby bolts 34 may be passed through these registering openings. The bolts 34 receive nuts 35, whereby the ring is mounted in a fixed position on the disk. Manifestly, the provision of the plurality of openings 30 in the disk permits the ring to be locked in various adjusted positions around the disk.

The transverse width of the ring is less than the transverse width of the rim 24 of the disk (Figure 4) and an outwardly directed annular flange 36 is provided on the outer edge portion of said ring. After the ring has been placed on the disk or supporting member, a weight member 37 is arranged to be mounted on the ring. As is clearly shown in Figure 8, the weight member includes a split ring portion 38 which has an arcuate or segmental weight 39 preferably made integral therewith. An annular rib 40 is formed on the inner surface of the ring portion 38 and this rib is adapted to engage the periphery of the ring 31, as is clearly shown in Figure 4. One side of the rib 40 engages the annular flange 36 on the ring 31, while the other side of the rib 40 is engaged by a retaining element or ring 41, which element surrounds the disk 19 and is secured by bolts 42 to the ring 31. The provision of the retaining element 41 forms an annular groove between said element and the flange 36 and the rib 40 of the weight member 37 is confined within said groove, whereby the member 37 is rotatably mounted on the ring 31. Obviously, since the retaining element 41 is removable, the mounting and removal of the weight member 37 is facilitated.

For fastening the weight member 37 in its various adjusted positions on the ring 31, the split portion of the weight member is formed with lugs 43 through which a tightening bolt 44 extends. After the weight is moved to its proper position relative to the ring 31, the bolt 44 is tightened to hold the same in such position.

To further aid in holding the weight member 37 in its adjusted position on the ring, the peripheral portion of said ring may be formed with a plurality of notches 45. These notches are spaced around the ring, as is clearly shown in Figures 3 and 6, and are adapted to register with notches 46 formed in the inner periphery of the weight member 37. After the weight has been moved to its proper position, one of the notches 46 will register with one of the notches 45 in the ring and a suitable key 47 may be inserted in these registering notches to further lock the weight against displacement from its adjusted position. It is pointed out that any desired number of the notches 45 and 46 may be provided, whereby the weight member 37 may be moved to any peripheral position relative to the ring 31. The notches 45 and 46, as well as the key or keys 47, are not essential and may be omitted, in which event the clamping of the ring portion 38 around the ring 31 is depended upon to hold the weight member in its adjusted position; or, if desired, other means of maintaining the weight in its various adjusted positions may be provided.

The ring 31 is provided with an opening 48 which extends entirely therethrough (Figure 4). The retaining ring or element 41 is formed with an opening 49 which is adapted to register with the opening 48 in the ring and the wrist pin 17, on which the lower end of the pitman is pivoted, is adapted to be inserted within these openings so as to pivotally connect the lower end of the pitman 16 with said ring. A suitable key slot 50 is provided in the opening 48, whereby the wrist pin 17 may be keyed within the ring 31.

The operation of the apparatus is obvious. The circular disk or supporting member 19 is keyed onto the crank shaft 18 so as to be rotatable therewith. The ring 31 is then mounted on the periphery of the disk 19 and is secured in its proper position thereon by the bolts 34 and nuts 35. Since the wrist pin 17 is secured to the ring 31, it will be manifest that the distance between the crank shaft 18 and the wrist pin 17 controls the length of the crank arm, which arm is formed between these two points. Since the disk is eccentrically mounted on the crank shaft and also since the ring is movable around the periphery of said disk, it will be obvious that the opening 48 may be moved relative to the crank shaft 18. Such movement of the opening 48 is accomplished by rotating the ring 31 on the disk and, as said opening is moved, the crank arm is reduced or lengthened according to such movement. Thus, the length of the crank arm is capable of infinite adjustment between minimum and maximum. It is well-known that the length of the crank arm will change the stroke of the pitman, thereby changing the pumping stroke.

The weight member 37 is rotatably mounted on the ring 31 and may be adjusted to any position thereon. This makes it possible to adjust the counterweight 39 with reference to the crank arm so as to provide for either lag or lead. Thus, the arrangement permits any counterbalancing effect to be obtained. The weight may be adjusted for proper counterbalancing during normal operating or to obtain any counterbalancing effect necessary for back cranking. The adjustments are accomplished readily and with minimum effort and the parts are positively locked in their adjusted positions to prevent accidental displacement. Manifestly, the crank arm may be varied in length either individually and separately of the adjustment of the weight member or simultaneously therewith.

In Figures 9 and 10, a slightly modified form of construction is shown. In this form, the weight member 37 is omitted and a pair of weight members 37' are substituted therefor. These members are constructed substantially the same as the member 37 except that the weight portion 39' of each is less than the weight portion 39 of the first mentioned weight 37. Also, the tranverse width of the weight members 37' is only half that of the weight member 37, with the result that both members 37' may be mounted on the periphery of the ring 31. By using two weights instead of one, it is possible to obtain a wider adjustment or distribution of the weight. The operation of this form is substantially the same as that hereinbefore described.

In Figures 11 to 15, still another form of the invention is shown. In this form, a split hub 50 is adapted to be secured to the crank shaft 18. A circular disk or supporting member 51 is preferably made integral with a supporting arm 52, which arm is, in turn, integral with the hub 50. In this manner, the supporting disk 51 is located or disposed at one side of the hub, whereby said disk is offset from the crank shaft 18. A ring 53 surrounds the supporting disk 51 and is provided with inwardly directed ears 54 having openings 55 therein. The openings 55 are adapted to register with a plurality of openings 56 which are spaced around the rim 51' of the disk. The provision of the openings 55 and 56 permits the ring to be moved to various positions around the disk and to be fastened in such adjusted positions by bolts 57 which extend through the registering openings. For counterbalancing the weight of the disk 51 which is offset from the crank shaft, a counterweight 51a, which is preferably integral with the hub, is disposed diametrically opposite the disk and this weight serves the same purpose as the weighted boss 28 in the other forms to balance the disk.

As is clearly shown in Figure 14, the inner periphery or surface of the ring 53 is offset or eccentric with relation to the outer periphery of said ring. An opening 58 is provided in the wide portion of the ring 53 and this opening is adapted to receive the wrist pin 17. Obviously, when the wrist pin is connected in the opening 58, the distance between said opening and the crank shaft 18 controls the length of the crank arm formed therebetween. By rotating the ring 53 to various adjusted positions on the supporting disk 51, the distance between these points may be varied, with the result that the length of the crank arm is also varied. Infinite adjustment between minimum and maximum may be thereby obtained.

A pair of weight members 37a, which are similar in construction to the weights 37', are mounted on the outer periphery of the ring 53. These weights are mounted in the same manner as are the weights 37 and 37' in other forms hereinbefore described. The mounting of the weights 37a, being the same as the mounting of the weights 37 and 37', said weights 37a may be moved to any desired adjusted position on the ring 53, whereby any desired counterbalancing effect may be produced. It is pointed out that it may be desirable to add additional weights to the weight members 37a. For this purpose, a plurality of openings 59 are formed in the weight members 37a, whereby additional weights 60, shown in dotted lines in Figure 15, may be added to the members 37a, being secured thereto by suitable bolts. In this form, the same infinite stroke adjustment as well as infinite counterbalancing effect may be obtained. It is noted that, if desired, additional weights may be added to the weights 39 and 39' of the other forms, in this same manner. Also, the eccentric ring 53 may be substituted for the ring 31 in said other forms. In all instances, infinite stroke adjustment and infinite counterbalancing effect between minimum and maximum may be had.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A counterbalance including, a circular support adapted to be eccentrically mounted on a crank shaft, a ring adjustably mounted on the support and adapted to receive a wrist pin, and a weight mounted on the ring and capable of adjustment therearound.

2. A counterbalance for crank shafts including, a circular support mounted eccentrically on and rotatable with a crank shaft, means adjustable around the support and having provision for mounting a wrist pin thereon whereby said pin is movable toward and away from the crank chaft to vary the distance therebetween and thereby vary the effective crank length, and a weight mounted on said means.

3. A counterbalance for crank shafts including, a circular support mounted eccentrically on and rotatable with a crank shaft, means adjustable around the support and having provision for mounting a wrist pin thereon whereby said pin is movable toward and away from the crank shaft to vary the distance therebetween and thereby vary the effective crank length, and a weight adjustably mounted on said means and capable of movement therearound, whereby said weight may be positioned circumferentially to obtain the desired balance.

4. A counterbalance for crank shafts including, a circular support mounted eccentrically on and rotatable with a crank shaft, means adjustable around the support and having provision for mounting a wrist pin thereon whereby said pin is movable toward and away from the crank shaft to vary the distance therebetween and thereby vary the effective crank length, means for locking said means in adjusted positions on the support, and a weight mounted on said adjustable means.

5. A counterbalance for crank shafts including, a circular support mounted eccentrically on and rotatable with a crank shaft, means adjustable around the support and arranged to be connected with a wrist pin which is movable toward and away from the crank shaft to vary the distance therebetween, means for locking said means in adjusted positions on the support, a weight mounted on said adjustable means and capable of movement therearound, whereby the weight may be positioned circumferentially to obtain the desired balance, and means for locking the weight in its various adjusted positions.

6. A counterbalance for crank shafts including, a crank arm adapted to be secured to the crank shaft and rotatable therewith, said arm including two elements which are movable relative to each other for varying the effective length of the crank from minimum to maximum, a weight mounted on said arm, and means for positioning the weight at various radial positions relative to the shaft to obtain the desired balance.

7. A counterbalance for crank shafts including, a crank arm adapted to be secured to the crank shaft and rotatable therewith, said arm including two elements which are movable relative to each other, for varying the effective length of the crank from minimum to maximum, a weight mounted on said arm, means for positioning the weight at various radial positions relative to the shaft to obtain the desired balance, and means for locking the weight in its various adjusted positions.

8. A counterbalance including, a support adapted to be mounted on a crank shaft which is offset with relation thereto, a ring adjustably mounted on the support and movable around the crank shaft, a wrist pin mounted on the ring, and a counterweight adjustably mounted on said ring.

9. A counterbalance for a crank shaft including, a support eccentrically mounted on the crank shaft and having an annular rim, a ring rotatably mounted on the rim and movable therearound, a wrist pin carried by the ring, means for clamping the ring in various adjusted positions on the rim to hold the pin in fixed positions relative to the crank shaft, and a counterweight adjustably and rotatably mounted on the ring and movable to various positions around the same.

10. A counterbalance for a crank shaft including, a support eccentrically mounted on the crank shaft and having an annular rim, a ring rotatably mounted on the rim and movable therearound, a wrist pin carried by the ring, means for clamping the ring in various adjusted positions on the rim to hold the pin in fixed positions relative to the crank shaft, a counterweight adjustably and rotatably mounted on the ring and movable to various positions around the same, and means for locking said weight in its various adjusted positions.

11. A counterbalance including, a circular support, a hub secured to the support and disposed radially thereof, said hub being adapted to be mounted on a crank shaft, an eccentric ring rotatably mounted on the support, a wrist pin carried by the ring, means for fastening the ring in various adjusted positions on the support, and a counterweight adjustably mounted on the ring.

12. A counterbalance for crank shafts including, a crank arm adapted to be secured to the crank shaft and rotatable therewith, said arm including two elements which are movable relative to each other for varying the effective length of the crank from minimum to maximum, weights mounted on said arm, and means for positioning the weights at various radial positions relative to the shaft and to each other to obtain the desired balancing effect.

13. A counterbalance for crank shafts including, a crank arm adapted to be secured to the crank shaft and rotatable therewith, said arm including two elements which are movable relative to each other for varying the effective length of the crank from minimum to maximum, weights mounted on said arm, means for positioning the weights at various radial positions relative to the shaft and to each other to obtain the desired balancing effect, and means for holding the weights in their various adjusted positions.

14. A counterbalance including, a support adapted to be mounted on a crank shaft which is offset with relation thereto, means for balancing the support, a ring adjustably mounted on the support and movable around the crank shaft, a wrist pin mounted on the ring, and a counterweight adjustably mounted on said ring.

15. A counterbalance for a crank shaft including, a support eccentrically mounted on the crank shaft and having an annular rim, means associated with said support for balancing the support on the shaft, a ring rotatably mounted on the rim and movable therearound, a wrist pin carried by the ring, means for clamping the ring in various adjusted positions on the rim to hold the pin in fixed positions relative to the crank shaft, and a counterweight adjustably and rotatably mounted on the ring and movable to various positions around the same.

ROBERT W. BIER.